United States Patent [19]

Olander

[11] 4,130,544

[45] Dec. 19, 1978

[54] OXIDATIVE COUPLING OF PHENOLIC MONOMERS BY THE PROGRAMMED ADDITION OF COMPLEXED MANGANESE CATALYSTS

[75] Inventor: Walter K. Olander, Mt. Vernon, Ind.

[73] Assignee: General Electric, Pittsfield, Mass.

[21] Appl. No.: 823,103

[22] Filed: Aug. 8, 1977

[51] Int. Cl.² ............................................. C08G 65/44
[52] U.S. Cl. ..................................... 528/215; 528/212
[58] Field of Search ..................................... 260/47 ET

[56] References Cited

U.S. PATENT DOCUMENTS

| 3,306,874 | 2/1967 | Hay | 260/47 |
|---|---|---|---|
| 3,962,180 | 6/1976 | Yonemitsu et al. | 260/47 ET |

*Primary Examiner*—Lester L. Lee
*Attorney, Agent, or Firm*—Morgan, Finnegan, Pine, Foley & Lee

[57] ABSTRACT

A novel method for the preparation of polyphenylene oxides is disclosed. The method comprises the oxidative coupling of a phenolic monomer.

25 Claims, No Drawings

OXIDATIVE COUPLING OF PHENOLIC MONOMERS BY THE PROGRAMMED ADDITION OF COMPLEXED MANGANESE CATALYSTS

This invention provides a novel method for the preparation of polyphenylene oxides which is based on the oxidative coupling of a phenolic monomer in the presence of a complexed manganese catalyst.

BACKGROUND OF THE INVENTION

The polyphenylene oxides and methods for their preparation are known in the art and are described in numerous publications including Hay U.S. Pat. Nos. 3,306,874 and 3,306,875. Manganese based catalysts for the oxidative coupling of phenolic monomers in the formulation of polyphenylene oxides are disclosed in Mc Nelis, U.S. Pat. No. 3,220,979; Nakashio, U.S. Pat. No. 3,573,257 and Nakashio, U.S. Pat. No. 3,787,361. The use of complexed manganese catalysts is disclosed in U.S. Pat. Nos. 3,956,242; 3,965,069 3,972,851; copending applications Ser. No. 753,509; Ser. No. 753,501; Ser. No. 753,506 and Ser. No. 753,507, all of which are hereby incorporated by reference.

The processes which employ homogenous complexed manganese catalysts have been carried out by combining all of the complexed manganese catalysts with the reaction mixture or where a portion of the monomer is added after initiation of the polymerization reaction. The term homogenous is used to describe a completely soluble complexed manganese catalyst which is soluble in an appropriate solvent such as methanol or in the monomer, e.g. 2,6-xylenol. These processes have worked quite well but it has been desirable to reduce catalyst usage, to control reaction rates, to improve performance at high solid levels and increase tolerance to higher water levels during polymerization. It has now been found that the use of a programmed addition cycle which comprises adding the complexed manganese catalyst in increments during the polymerization cycle will reduce by up to 50% the amount of catalyst that is required to oxidatively couple a phenolic monomer. Moreover, the programmed addition of the complexed manganese catalyst results in a more controllable exothermic reaction, improved reaction rates as compared with bulk catalyst addition methods, reduced catalyst losses from hydrolysis from the water formed during the polymerization and improved reaction performance at high levels of solids, i.e. about 24 to 26%. The above results are obtained without adversely affecting the quality of the polyphenylene oxide resin when it is combined with a styrene resin. In addition, the use of a programmed addition of the complexed manganese catalyst may be applied to a continuous polymerization process.

Accordingly, it is a primary object of the present invention to provide an improved process for the preparation of polyphenylene oxide resins which is based on the use of a programmed addition of a complexed manganese catalyst.

DETAILED DESCRIPTION OF THE INVENTION

The present invention provides an improved process for the preparation of a polyphenylene oxide by the oxidative coupling of a phenolic monomer in the presence of oxygen and a complex manganese catalyst wherein catalyst is added to the reactor in incremental amounts during the polymerization reaction.

The preferred polyphenylene oxides have units of the formula:

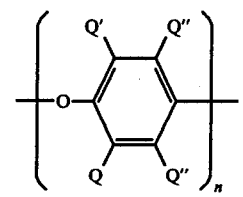

wherein Q is a monovalent substituent selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenol nucleus; and Q' is as defined for Q, and in addition may be halogen with the proviso that Q, Q' and Q" are all free of a tertiary carbon atom and n is an integer of at least 50.

The preferred polyphenylene oxide is poly(2,6-dimethyl-1,4-phenylene oxide) having an intrinsic viscosity of from about 0.4 to about 0.65 as measured in chloroform at 30° C.

The process of the invention is based on the incremental addition of a complex manganese catalyst to cause the oxidative coupling of a phenolic monomer in the presence of oxygen and an organic solvent.

The phenolic monomer is perferably of the formula:

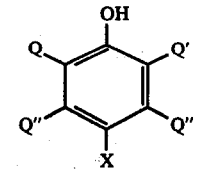

wherein X is a substituent selected from the group consisting of hydrogen, chlorine, bromine and iodine; Q is a monovalent substituent selected from the group consisting of hydrcarbon radicals, halohydrocarbon radicals having at least two carbon atoms between the halogen atom and the phenol, hydrocarbonoxy and halohydrocarbonoxy radicals having at least two carbon atoms between the halogen atom and the phenol nucleus; and Q' is as defined for Q, and in addition may be halogen with the priviso that Q, Q' and Q" are all free of a tertiary carbon atom.

The nature of the particular manganese catalyst is not critical although it is preferred to employ a complex manganese catalyst of the formula:

$(L)_x Mn$ wherein L is an ω-hydroxyoxime ligand of the formula:

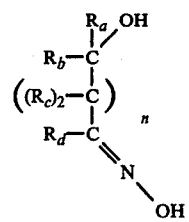

wherein $R_a$, $R_b$, $R_c$ and $R_d$ are independently selected from the group consisting of hydrogen, acyclic and cyclic hydrocarbon radicals, and is a positive integer equal to 0 or 1, and x is a positive number at least equal to about 1.0.

The preferred species of $R_a$, $R_b$, $R_c$, and $R_d$ are selected from the group consisting of hydrogen, acyclic and cyclic hydrocarbon radicals or acyclic and cyclic hydrocarbon radicals having electron-releasing constituents selected from the group consisting of $-NH_2$, $-NHR^1$, $-N(R^1)_2$, $-OH$, $-OR^1$ and $-OOCR^1$, wherein $R^1$ is an alkyl group of from 1 to 10 carbon atoms. Where acyclic or cyclic hydrocarbon radicals are employed, they should include from about 1 to about 30 carbon atoms. It is expecially preferred that at least one of $R_b$ and $R_d$ are aromatic.

Preferred catalysts include those based on benzoin oxime, p-dimethylaminobenzoin oxime and 2-phenyl-2-hydroxy-butan-3-one oxime.

The programmed or incremental addition of the complex manganese catalyst should be carried out so that the catalyst is added at a sufficient rate to maintain active polymerization of the phenolic monomer. This can be done by combining the total amount of the catalyst with all or a portion of the monomer and feeding this mixture into a reactor where it is polymerized in the presence of a base, oxygen and if desired an amine. Generally 5-25% by weight of the total amount of catalyst solution that is to be employed may be added to the reactor to start the polymerization and the remaining amount may be added continuously or in divided amounts over a polymerization cycle of 15 to 120 minutes.

The catalyst may be added directly to the reactor as a 1-25% by weight solution in a lower alkanol of 1-6 carbon atoms.

Preferably a methanol or a methanol-toluene solution (e.g. 2-15% by weight) of the complex manganese catalyst may be metered into a reactor containing base, monomer and oxygen at a rate which maintains active polymerization. This amount can readily be determined and may vary with the particular catalyst species. Generally the mole ratio of phenolic monomer to manganese catalyst will range from 250:1 to 5000:1. The types and quantity of base e.g. alkali metal bases, which are required to activate the complex manganese catalyst and the reaction conditions are described in U.S. Pat. No. 3,956,242 which is incorporated by reference. In the absence of base and amines, toluene solutions of manganese bis(benzoin oxime) and 2,6 xylenol are stable and no oxidative coupling occurs. This is believed unique to ω-hydroxyoxime catalysts.

The process may be carried out in the presence of a primary or secondary amine. The primary amines are preferably of the formula $(H_2N)_y - R^2$ wherein $R^2$ is selected from mono and polyvalent aliphatic and aromatic radicals, y is a positive integer at least equal to 1 with the proviso that (a) at least three carbon atoms separate any amino group from any amino group and (b) at least two carbon atoms separate any amino group from any other nucleophile. Preferred compounds are those where y is at least equal to about 2. The amines may be selected from polyamino substituted mono and polycyclic aliphatic and aromatic compounds. Other primary amines and the mole ratios which may be employed, i.e., about 100: 0.05 to about 100: 1.5 of phenolic monomer to amine are disclosed in U.S. 3,965,069 which is incorporated by reference.

Generally reaction temperatures may vary between about 0° and about 50° C. Preferred temperatures will vary between about 20° to about 30° C.

Superatmospheric pressures of 1-40 psig or 1 to 1000 psig or higher may be employed if desired.

The reaction may be terminated and the polymer may be recovered from the reaction mixture by the use of standard techniques such as the use of aqueous acetic acid followed by precipitation with a suitable anti-solvent such as methanol. The process may be carried out continuously in a series of reactors wherein each reactor is provided with a supply of fresh catalyst so that as the reaction solution is transferred from one reactor to another, polymer of increasing molecular weight is obtained until the desired degree of polymerization is obtained.

DESCRIPTION OF THE PREFERRED EMBODIMENTS

The following examples illustrate the process of this invention. They are merely illustrative and are not to be construed to limit the invention in any manner whatsoever.

EXAMPLES

A complex manganese chelate catalyst is prepared from anhydrous manganese (II) chloride and α-benzoin oxime as an 8-10% methanol solution. When a programmed catalyst addition is employed (Runs 4-6), the catalyst is co-dissolved in the 2,6 xylenol which already is a 50/50 weight percent solution in toluene. Of this solution b 85% is uniformly programmed over monomer addition times shown in Table 2. In the control polymerizations (Runs 1-3) the entire catalyst solution is added at the beginning of the oxidative coupling reaction with the initial 15% charge of monomer. Complete reaction compositions are reported in Table I.

A one gallon Chemco reactor is used in all the runs. Oxygen is supplied through a dip tube located near the impeller at a constant rate of 4 SCFH. The reaction temperature is allowed to fluctuate between 25-30° C. using an internal heat exchanger. The following procedure is employed:

The excess toluene and methanol and amine are charged to the reactor and oxygenated. Fifteen percent of the monomer charge as a 50/50 (weight) solution in toluene is added containing either 100 percent of the catalyst (Runs 1-3) or 15 percent of the catalyst (Runs 4-6). Simultaneously with the addition of the caustic and polymerization initiation, the monomer addition sequence is started. The reactions are terminated at the times indicated in Table II and intrinsic viscosities measured. Programmed catalyst addition resulted in faster polymerization reaction times.

TABLE I

| | | | | Polymerization Compositions | | | | | |
|---|---|---|---|---|---|---|---|---|---|
| Run | Scale (g) | 2,6 Xylenol (g) | Toluene (g) | Methanol (g) | MnCl$_2$ (g) | α-Benzoin Oxime (g) | 50% NaOH (g) | DBA[1] (g) | [2,6]/[Mn] |
| 1 | 2500 | 600 (24) | 1600 (64) | 300 (12) | .4127 | 1.4907 | 24 | 6.0 | 1500:1 |

TABLE I-continued

| | | | Polymerization Compositions | | | | | | |
|---|---|---|---|---|---|---|---|---|---|
| Run | Scale (g) | 2,6 Xylenol (g) | Toluene (g) | Methanol (g) | MnCl$_2$ (g) | α-Benzoin Oxime (g) | 50% NaOH (g) | DBA[1] (g) | [2,6]/[Mn] |
| 2 | 2500 | 650 (26) | 1550 (62) | 300 (12) | .3825 | 1.3817 | 26 | 6.5 | 1750:1 |
| 3 | 2500 | 600 (24) | 1600 (64) | 300 (12) | .3536 | 1.2771 | 24 | 6.0 | 1750:1 |
| 4 | 2500 | 600 (24) | 1600 (64) | 300 (12) | .4052 | 1.4635 | 24.0 | 9.0 | 1500:1 |
| 5 | 2500 | 550 (22) | 1650 (66) | 300 (12) | .3247 | 1.1726 | 22.0 | 5.5 | 1750:1 |
| 6 | 3000 | 660 (22) | 1980 (66) | 360 (12) | .3020 | 1.0908 | 26.4 | 5.3 | 2250:1 |

Weight percent in Parenthesis.
1 di-n-butylamine

TABLE II

| | | Monomer and Catalyst Distribution | | | | |
|---|---|---|---|---|---|---|
| Run | Catalyst Addition Time | Solids (wt.%) | Monomer Addition | Mole Ratio of 2,6-xylenol to Manganese | Reaction Timme (minutes) | I.V.* (dl/g) |
| 1 | 100% at time = 0 | 24 | 85% over 42 min. | 1500 | 115 | 0.55 |
| 2 | 100% at time = 0 | 26 | 85% over 50 min. | 1750 | 120 | 0.46 |
| 3 | 100% at time = 0 | 24 | 85% over 52 min. | 1750 | 120 | 0.42 |
| 4 | 85% over 48 min. | 24 | 85% over 48 min. | 1500 | 70 | 0.49 |
| 5 | 85% over 48 min. | 22 | 85% over 48 min. | 1750 | 100 | 0.54 |
| 6 | 85% over 38 min. | 22 | 85% over 38 min. | 2250 | 100 | 0.50 |

*As measured in chloroform at 30° C.

Although the above examples have been shown various modifications of the present invention, other variations are possible in light of the above teachings. It is, therefore, to be understood that changes may be made in the particular embodiments of the invention described which are within the full intended scope of the invention as defined by the appended claims.

I claim:

1. In a process for the preparation of a polyphenylene oxide resin by the oxidative coupling of a phenolic monomer in the presence of oxygen and a complex manganese catalyst, the improvement which comprises adding the catalyst to the reactor in incremental amounts during the polymerization reaction.

2. The process of claim 1 wherein the phenolic monomer is of the formula:

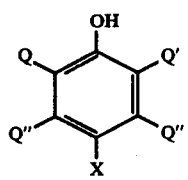

wherein X is a substituent selected from the group consisting of hydrogen, chlorine, bromine, and iodine; Q is a monovalent substituent selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenol nucleus; and Q' is as defined for Q, and in addition may be halogen with the proviso that Q, Q' and Q'' are all free of a tertiary carbon atom.

3. A process of claim 2 wherein the complex manganese catalyst is of the formula:

$(L)_x Mn$ wherein L is an ω-hydroxyoxime ligand of the formula:

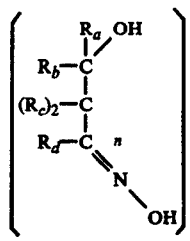

wherein $R_a$, $R_b$, $R_c$, and $R_d$ are independently selected from the group consisting of hydrogen, acyclic and cyclic hydrocarbon radicals, and n is a positive integer equal to 0 or 1, and x is a positive number at least equal to about 1.0.

4. The process of claim 3 wherein $R_a$, $R_b$, $R_c$ and $R_d$ is selected from the group consisting of hydrogen, acyclic and cyclic hydrocarbon radicals, or acyclic and cyclic hydrocarbon radicals having electron-releasing constituents selected from the group consisting of —NH$_2$, —NHR$^1$, N(R$^1$)$_2$, —OH, —OR$^1$ and —OOCR$^1$, wherein R$^1$ is an alkyl group.

5. The process of claim 4 wherein each acyclic or cyclic hydrocarbon radical contains from about 1 to about 30 carbon atoms.

6. The process of claim 4 wherein at least one of $R_b$ and $R_d$ is aromatic.

7. The process of claim 2 wherein the phenolic monomer is 2,6-xylenol.

8. The process of claim 2 wherein $R_b$ and $R_d$ substituent is an aromatic radical.

9. The process of claim 2 wherein said process is carried out in the presence of a primary or secondary amine.

10. The process of claim 9 wherein said primary amine is of the formula:

$(H_2N)_y—R^2$ wherein R$^2$ is selected from mono and polyvalent aliphatic and aromatic radicals, y is a positive integer at least equal to 1 with the proviso that (a) at least three carbon atoms separate any amino group from any other amino group and (b) at least two carbon atoms separate any amino group from any other nucleophile.

11. The process of claim 10 wherein y is at least equal to about 2.

12. The process of claim 10 wherein the amine is selected from the group consisting of polyamino substituted mono polycyclic aliphatic and aromatic compounds.

13. The process of claim 10 wherein the process is carried out in the presence of an alkali metal base.

14. The process of claim 13 wherein the process is carried out at a temperature of from about 0° to about 50° C.

15. The process of claim 14 wherein the process is carried out at a temperature of from about 20° to about 30° C.

16. The process of claim 15 wherein the process is carried out at superatmospheric pressure.

17. The process of claim 16 wherein the ω-hydroxyoxime is benzoin oxime.

18. The process of claim 16 wherein the ω-hydroxyoxime is anisoin oxime.

19. The process of claim 16 wherein the ω-hydroxyoxime is p-dimethylaminobenzoin oxime.

20. The process of claim 16 wherein the ω-hydroxyoxime is 2-phenyl-2-hydroxy-butan-3-one.

21. The process of claim 16 wherein x is a positive number equal to about 2.

22. The process of claim 1 wherein the catalyst is added to the reactor in combination with the monomer.

23. The process of claim 1 wherein the catalyst is added to the reactor in admixture with a lower alkanol.

24. A process for the preparation of a polyphenylene oxide which comprises:
(a) combining a manganese catalyst with a phenolic monomer to form a polymerizable mixture;
(b) feeding 5-25% by weight of said mixture to a reactor where it is polymerized in the presence of base and oxygen; and
(c) after polymerization has started, feeding the balance of said polymerization mixture over a polymerization cycle of 15 to 120 minutes.

25. A process as defined in claim 24 wherein the phenolic monomer is 2,6-xylenol and the balance of the polymerization mixture is added continuously.

* * * * *

UNITED STATES PATENT AND TRADEMARK OFFICE
CERTIFICATE OF CORRECTION

PATENT NO. : 4,130,544
DATED : December 19, 1978
INVENTOR(S) : Walter K. Olander It is certified that error appears in the above-identified patent and that said Letters Patent are hereby corrected as shown below:

In Column 2, line 44, "hydrcarbon" should be --hydrocarbon--.

In Column 4, line 39, after "solution", delete --b--.

Signed and Sealed this

Seventeenth Day of April 1979

[SEAL]

Attest:

RUTH C. MASON
Attesting Officer

DONALD W. BANNER
Commissioner of Patents and Trademarks